May 28, 1946.  A. P. KONTER  2,401,082
MOVING APPARATUS AND CONTROL THEREFOR
Filed June 18, 1941  3 Sheets-Sheet 1

INVENTOR
August P. Konter
Hawgood and Van Horn
ATTORNEYS

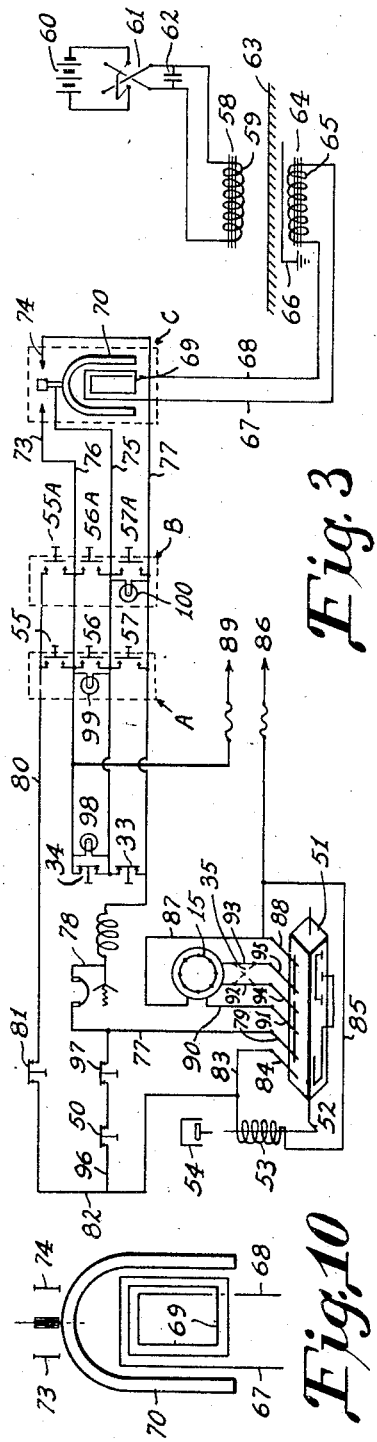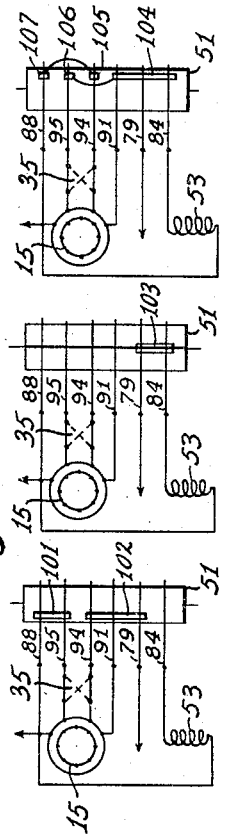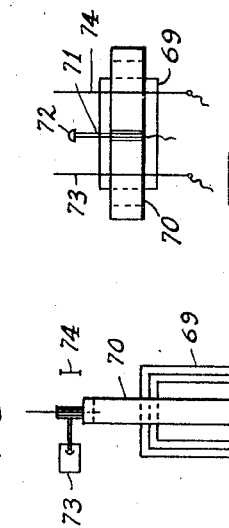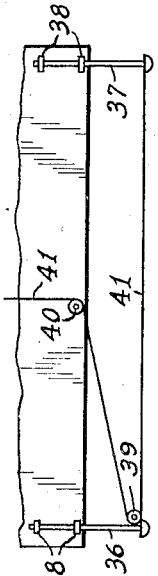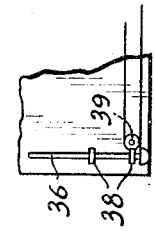

May 28, 1946.  A. P. KONTER  2,401,082
MOVING APPARATUS AND CONTROL THEREFOR
Filed June 18, 1941  3 Sheets-Sheet 3
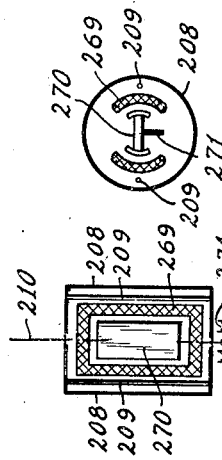
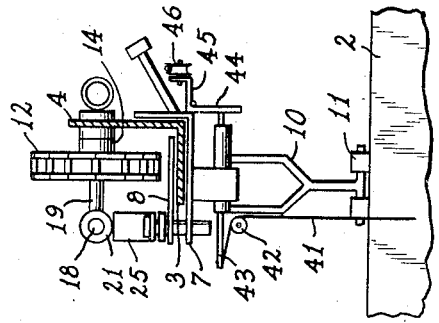
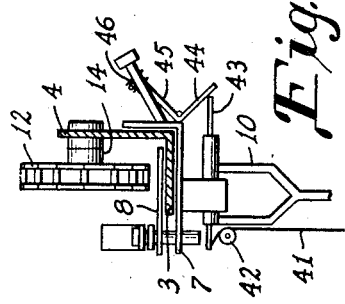
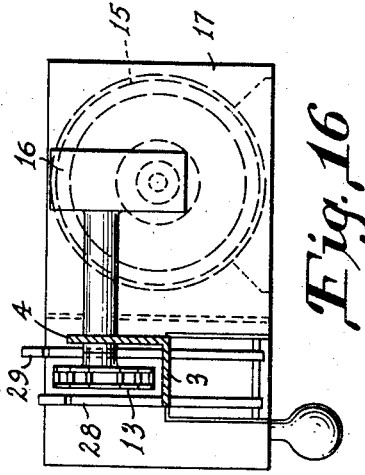
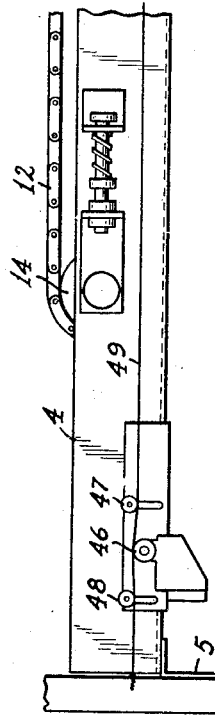
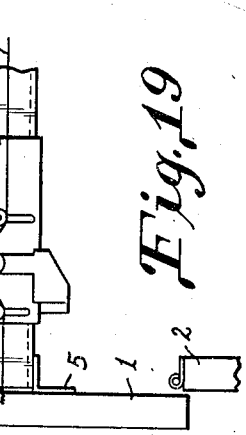
INVENTOR
August P. Konter
by Hawgood and Van Horn
ATTORNEYS Patented May 28, 1946

2,401,082

UNITED STATES PATENT OFFICE 2,401,082

MOVING APPARATUS AND CONTROL THEREFOR

August P. Konter, Shaker Heights, Ohio

Application June 18, 1941, Serial No. 398,613

2 Claims. (Cl. 268—59)

This invention relates to means for moving objects such as doors, gates, and the like, and to controlling the operation of such moving means.

An object of the invention is to provide an improved object moving apparatus.

Another object of the invention is to provide an improved operating system which may be operated from any one of a plurality of points.

Another object is to provide an improved operating mechanism which may be controlled from the interior of a movable vehicle.

Another object is to provide an improved operating mechanism which may be controlled from a remote position, such as the interior of a vehicle, without physical contact with any of the parts of the apparatus.

Another object is to provide an improved operating mechanism which will be reliable in operation.

Another object is to provide an improved operating mechanism which will preclude accidental closing of the door upon a person or object.

Another object is to provide an improved operating mechanism which will be simple in construction.

Another object is to provide an improved operating mechanism which will be compact.

Another object is to provide an improved operating mechanism which will operate with relatively little power.

Another object is to provide an improved operating mechanism to which power need be supplied only while the device is being actuated.

Another object is to provide an improved operating device which will indicate at a remote point the condition of the parts of the apparatus at any given time.

Other objects will hereinafter appear.

The invention will be better understood from the description of one practical embodiment thereof illustrated in the accompanying drawings, in which:

Figure 3 is a diagrammatic representation of the circuits, controls, and the like of the apparatus of Figures 1 and 2;

Figures 4, 5 and 6 are plan views of the commutator mechanism shown in Figure 3, in various positions, illustrating its operation;

Figure 1:
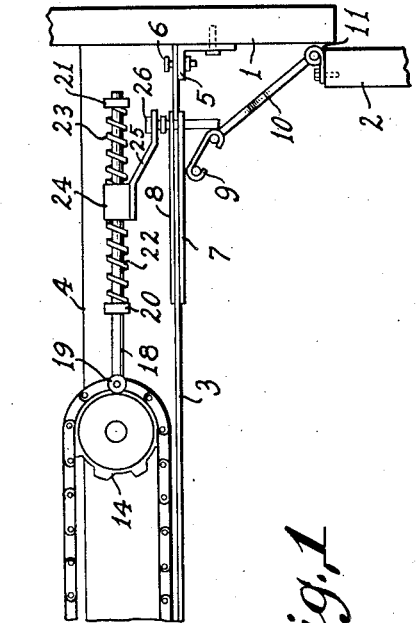
Figure 1 is a side elevational view of the apparatus arranged to open a door of the type which rises and swings from a horizontal to a vertical position, such as the overhead doors now in use in garages and similar places.
Figure 2:
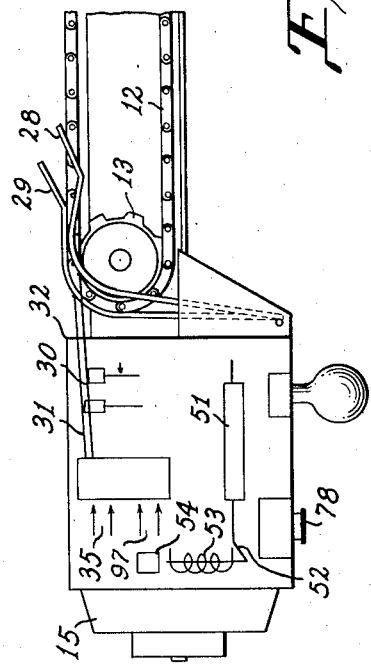
Figure 2 is a plan view of the apparatus of Figure 1.
Figure 2:
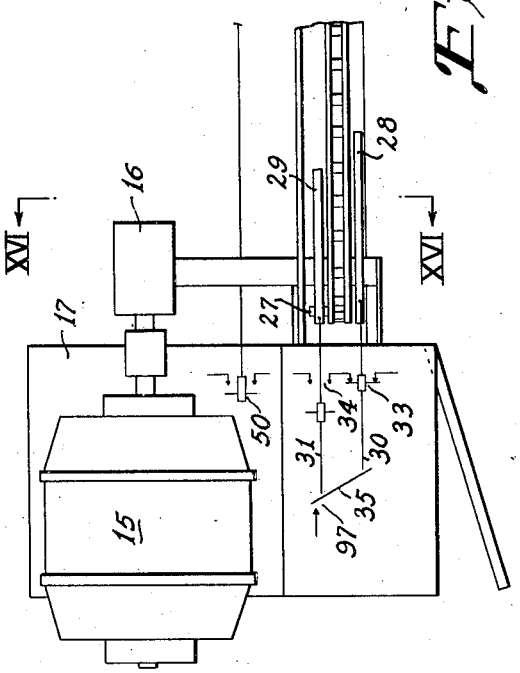

Figures 7, 8, and 9 are end elevational views corresponding to Figures 4, 5, and 6, respectively;

Figures 10 and 11 are side elevational views of the relay apparatus illustrated in Figure 3;

Figures 12 and 13 are plan views corresponding to Figures 10 and 11, respectively;

Figure 14 is a fragmentary elevational view of a corner of the door when in completely lowered position;

Figure 15 is a fragmentary elevational view of the entire bottom edge of the door just prior to closing, or immediately after opening;

Figure 16 is a cross sectional view taken on the line XVI—XVI of Figure 2;

Figure 17 is a fragmentary transverse sectional view taken on the line XVII—XVII of Figure 2;

Figure 18 is a side elevational view taken from the opposite side of Figure 1 of the parts of the apparatus adjacent the door;

Figure 19 is a view similar to Figure 18 showing the parts in the position they occupy when the safety device is being actuated;

Figure 20 is a transverse sectional view of the parts in the position they occupy in Figure 19;

Figure 21 is a view somewhat similar to Figures 12 and 13 of a modified form of relay, parts being shown in section; and Figure 22 is an elevational view of the parts of Figure 21.

In Figures 1, 2, 18 and 19, the lintel over the door of the garage is illustrated at 1, while in some of these figures the upper edge of the door itself is illustrated at 2, in each of these figures, the door being shown in or near its closed or vertical position.

It will be understood that the door is mounted on suitable guides and supports, so that when its upper edge 2 is moving interiorly of the garage, that is, to the left as seen in Figure 1, or to the right as seen in Figures 18 and 19, the lower edge will rise until the door has moved from a vertical position to a horizontal position behind the lintel and above the space provided for the vehicle within the garage. The guides and supports for the door may be of any desired or well known construction and are, therefore, not illustrated herein.

The mechanism for operating the door is shown as mounted upon a horizontal structural member illustrated as a channel shaped steel beam having a lower horizontal flange 3 and an upwardly extending vertical flange 4.

This beam is secured in position in any desired manner, as by brackets 5 and screws 6.

Slidable on the beam is a carriage consisting of an angle 7 and a plate 8, the former of which extends across under the flange 3 of the beam and up adjacent flange 4, and the latter of which slides upon the upper surface of the horizontal flange 3.

To the under side of the carriage is secured a link 9 having an elongated slot in which is positioned the end of a link 10 pivoted at its lower end to a bracket 11 fixed to the top of the door, so that as the carriage is slid along the beam, the upper edge of the door will be moved in a generally horizontal direction, some variation in height being permitted by the links 9 and 10.

The means shown for reciprocating the carriage upon the beam consists of an endless flexible element, illustrated as a roller chain 12 passing over sprockets 13 and 14 and driven by a motor 15 through speed reduction gearing 16, the motor and speed reduction gearing being mounted upon a bracket 17 fixed to the beam.

The connection between the carriage and the chain is by means of a rod 18 pivoted at 19 to the pivot between two successive links of the chain and carrying, fixed to it, spaced collars 20 and 21. Springs 22 and 23 bear upon these collars and between the inner ends of the springs is a sleeve 24 having a downwardly extending arm 25 attached, as by pin 26, to the upper part or plate 8 of the carriage.

Thus it will be seen with the parts adjusted as shown in Figure 1, when the pivot 19 is in its extreme right hand position the door will be completely closed.

If, however, the motor be actuated to drive the chain around the sprockets, the bar 18 will be drawn to the left, compressing spring 23 until the compression of this spring is sufficient to overcome the weight and inertia of the door, when the upper end of the door will be drawn along behind the carriage until the door has reached its uppermost or horizontal position.

If the parts be so adjusted that this is accomplished when the pivot 19 has passed half way around sprocket 13, further driving of the motor in the same direction will reciprocate the parts to the right, closing the door, and it thus will be apparent that the motor may drive continuously in a single direction to effect both open and closing motions.

However, if the sprockets be spaced slightly further apart than is necessary to accomplish this result, a reversible motor must be used and the motor caused to stop when the door has been fully raised. The motor illustrated is of the reversible type.

The link 9 with its elongated slot, as well as the springs 22 and 23, permits the motor to attain substantial speed before maximum load is imposed upon it, facilitating the opening and closing of the door, as well as eliminating jerks in its operation and compensating for slight discrepancies in the adjustment of the sprockets and the link 19 upon the chain.

The elongated slot of link 9 at its open side also permits the unhooking or releasing of the link 10 from the mechanism carried by the beam so that the door may be operated by hand as for instance, during disruption in the power service.

The sprockets are mounted upon horizontal stub shafts fixed to the flange 4 of the beam, and may be adjusted to provide proper tension on the chain.

The pivot 19 is extended at one side of the chain and a somewhat similar pin 27 is provided at the point shown as approximately half way around the chain therefrom and projects on the other side. These pins are in position to contact, respectively, with the pivoted arms 28 and 29, the arm 28 being pivoted to the side of sprocket 13 where it will be contacted by pin 19, and arm 29 being on the opposite side of the sprocket to be contacted by the pin 27.

If desired, additional pins may be attached to the chain ahead of or behind pins 19 and 27 to vary the length of run of the mechanism and adapt it to different conditions of installation.

The arms are so shaped that the pin, in approaching from either direction, will swing the arm to the left as shown in Figure 1, in which arm 28, is, of course, out of contact with pin 19, while arm 29 is shown in its extreme position under the pressure of pin 27.

Connected to arm 28 is a push rod 30. A similar push rod 31 is connected to arm 29. These rods enter a control containing a box 32 carried by the bracket 17. The push rods are provided, respectively, with switches 33 and 34, the operation of which will be more fully described in conjunction with Figure 3, and the ends of the rods are arranged to operate a reversing switch 35. The reversing switch, of course, might be omitted if the spacing of the sprockets is sufficiently accurate in its relation to the distance of reciprocation of the door, so that the chain may pass around the sprockets continuously in a single direction, but will be essential if the spacing is not so determined, and if it is, therefore, necessary that the motor be driven alternately, first in one direction and then in the other.

The operation of this switch also will be more fully described in conjunction with Figure 3.

A safety device is provided on the door consisting of contact or carrying rods 36 and 37, extensibly slidable in vertical guides 38, these rods when the door is opened, being adapted to drop below the lower edge as shown in Figure 15, and when the door is completely closed to be concealed behind it, as indicated in Figure 14.

A sheave 39 is carried by the lower end of rod 36 and a sheave 40 is fixed to the door adjacent its lower edge, so that a cord 41 attached to the lower end of rod 37 extends transversely between the lower ends of the rods, then inwardly to the center of the door, and upwardly along its inner surface.

The upper end of this cord passes over a sheave 42 and the end of the cord is secured to a transverse rod 43 slidable through the door link 10.

The inner end of the rod 43 is arranged to contact the downwardly extending arm 44 of a bell crank pivoted to the carriage and carrying on its horizontal arm 45 a sheave 46.

This sheave normally is in alignment with two sheaves 47 and 48 on the carriage, and a second cord or wire 49 is extended horizontally along these sheaves as indicated in Figure 18, the wire being rigidly fastened to the lintel 1 or beam 4 at one end and having its other flexibly fastened to switch 50.

The end of this wire remote from the door is connected to a switch 50 which is closed whenever the length of the wire is shortened by tension upon the cord 41 rocking the bell crank from the position of Figure 17 to that of Figure 20.

This of course will occur when the door is lowered upon an object which strikes the cord 41 between the rods 37 and 36, and the switch operates as a safety device to stop and reverse the lowering of the door should a person, car, or other object be under it.

Within the box 32 is trunnioned a square commutator bar 51 of insulating material, carrying electrical contacts or conductors as is most clearly apparent from Figures 3 to 9, the end of one trunnion of this commutator being provided with a crank arm 52 adapted to be actuated by electromagnetic means such as a solenoid 53. A dash pot 54 is connected to the armature of the solenoid to delay its motion.

The apparatus may be actuated from a number of control stations, and in Figure 3, three such stations are illustrated, one at A, which may conveniently, for example, be within a house, one at B, which may be within the garage, and one at C, which is intended to be actuated from a vehicle standing or moving on a drive way.

The first two stations each consist of manual controls, illustrated as three push buttons, 55, 56, and 57, and 55a, 56a, and 57a, respectively. The latter however consists of a relay.

Mounted upon the vehicle from which the mechanism is to be controlled is a core of magnetic material 58 surrounded by a coil 59 to which current may be supplied from the battery 60 or car generator, this current being controlled by a switch 61. A condenser has been indicated at 62 shunted across the coil 59. By these means, a magnetic field is set up about the core 58.

Switch 61 is arranged to reverse the current passing through coil 59 so that the operator of the vehicle can select the polarity produced and thus operate the relay in either of two directions to energize either of two control circuits, as will be hereinafter described.

Bedded under the surface 63 of the driveway is another magnetic core 64 provided with a coil 65, constituting in effect the secondary of a transformer, of which the coil 59 is the primary. The driveway surface conceals the secondary part of the transformer.

Hence, the field set up by coil 59 induces current into coil 65.

To shield coil 65 against undesired actuation by lightning or the like, a non-magnetic shield such as copper or brass mesh 66 may be embedded in the paving of the driveway and grounded as indicated. This will, however, not effect the magnetic field from passing to the coil 65.

Current induced in coil 65 passes through conductors 67 and 68 to a coil 69 in the relay mechanism. Surrounding this coil 69 is a U-shaped fixed magnetic armature 70 carrying an extending arm 71 provided with an electrical contact 72, which, depending on the way the magnet is rotated, may contact one or the other of two stationary contacts 73 and 74. The armature itself is connected to a conductor 75, so that it controls two circuits one through each of the contacts 73 or 74.

Conductor 75 is connected between switches 56 and 57, 56a and 57a, and 33 and 34.

Conductor 76 leading from stationary contact 73 is connected between switches 55 and 56, 55a and 56a, and to the second side of switch 34.

Conductor 77 connected to contact 74 is connected to the second sides of switches 57, 57a and 33, and extends thence through a motor overload circuit breaker 78 to conductor 77, thence to a stationary brush or contact 79 bearing upon the commutator 51.

The remaining sides of switches 55 and 55a are joined by a conductor 80 which extends to switch 81, this being a switch which is mechanically closed when the motor is operating and open at all other times, and thus assures that one circuit controlled by switches 55 and 55a can be operated only while the motor is running. From switch 81 a conductor 82 extends to the solenoid 53, having a branch 83 connecting it with a brush 84 at the commutator; brush 84 acts as a holding contact until the motor stops.

From solenoid 53 a conductor 85 connects to one side of the main power line 86. This conductor is connected to a conductor 87 having one branch connected to either the field or armature of the motor 15 and another branch connected to a brush 88 at the commutator.

The other side 89 of the power line is connected directly to the conductor 76.

Conductor 90 extends from the other side of the field or armature of the motor to a brush 91 at the commutator, and two conductors 92 and 93 extend to brushes 94 and 95, respectively, passing through the reversing switch 35.

A conductor 96 connects conductor 82 to conductor 77 having in it, in series, safety switch 50, and a switch 97 which is closed only when the door is descending or ready to descend. This switch 97 may be either directly operated by the door or actuated by the same rods which actuate the reversing switch 35.

Thus any tripping of the safety mechanism by contact of the cord 41 will reverse the operation of the door only from descending to ascending. Consequently, if the cord be struck while the door is rising, it will not automatically reverse due to switch 97 being open and come down upon a person who may have touched it, adding to the safety of the device.

Two incandescent lamps 98 and 99 are shunted cross between conductors 75 and 76, and these being of high resistance will be illuminated only when the circuit between these two lines is broken and will not pass sufficient current to actuate the apparatus.

Similarly, a tell tale light 100 is connected across from conductor 75 to conductor 77 and operates in the same manner to indicate when the circuit between these two lines is open.

The operation of the device is as follows:

Figure 3 illustrates the parts in the position which they may occupy during the door opening movement and after the door has moved sufficiently to permit both switches 33 and 34 to close. From this figure it will be seen that line current is received by conductors 86 and 89. From the former of these, the current passes to contact 88 and conductor 87.

Conductor 87 conveys the current to one coil of the motor 15, while from conductor 86 current passes through brush 88 to conductor 101 of the commutator, to brush 95 and thence through conductor 93 and switch 35 to the other coil of the motor.

The other sides of the two coils of the motor are connected by conductors 90 and 92 to brushes 91 and 94, respectively, both bearing upon the conductor 102 of the commutator, which is also in contact with brush 79 so that the current passing from both coils of the motor reaches, by way of conductor 77, the overload circuit breaker 78.

If a D. C. motor is used, the two coils thereof will, of course, be the field and armature. With an A. C. motor, of course, the coils will be different field coils.

Thence, it passes through switches 33 and 34 to conductor 76, to which is joined conductor 89, returning it to the other side of the power line 89.

When the door has reached its fully open position, pivot 19 strikes arm 28, moving this to its innermost position and so, through rod 30 opens switch 33, which breaks the circuit above described, stopping the motor.

When now it is desired to lower the door, the circuit may be completed in any one of three ways.

The operator may manually close "down" switch 57 or switch 57a, either of which is in parallel with switch 33, or he may, by means of the coil on the bar, energize coils 65 and 69 to swing contact 71 against contact 74, which will reestablish the circuit through the motor and source of power to start the former.

It will be apparent that if he pushes the "up" button 56 (or 56a) or if contact 71 strikes stationary contact 73, no circuit is completed, as these are merely shunted around switch 34 which was already closed.

Having reestablished the circuit, switches 33 and 34 close and the motor continues to drive the operating chain until pin 27 engages arm 29. This moves inwardly the rod 31, opening switch 34 and stopping the motor.

It will be noted that as the rods 30 and 31 are alternately pushed inwardly, they operate the reversing switch 35 to change the connections on the motor so that it drives in reverse direction in closing the door from that in opening the same. Down switch 97 is similarly opened and closed.

When it is desired to again start the motor, it is necessary now to push the "up" button 56 or 56a or to bring contact 71 against contact 73.

If, at any time, the operator desires to reverse the moving door, he has merely to press either reverse switch 55 or 55a, and closing either of these switches permits current to flow from line 76 to line 80, thence through line 82 to solenoid 53, and by line 85, back to the source of power.

As soon as the solenoid 53 is energized, it starts rotation of the commutator 51 through the lever above described. The brushes of course, remain in contact with contacts 101 and 102 during the initial part of this rotation, but when the commutator has turned so that its corner passes these brushes, they snap on to the adjacent flat side thereof, which carries the conductor 103, which engages brushes 79 and 84, thus maintaining the circuit through the solenoid. At the positions illustrated in Figures 5 and 8, the motor has been stopped by the opening of contacts 88, 91, 94 and 95. The delay dash pot 54 delays the rotation of the commutator 51 long enough to assure the motor having opportunity to stop before being reversed.

The solenoid 53 continues to rotate the commutator 51, and on the next quarter turn, contacts 104, 105, 106 and 107 contact the various brushes.

It will be noted that contacts 104 and 106 are connected together, as are contacts 105 and 107 so that the connections to the armature and field of the motor have been reversed from what they were in their original position in relation to each other and the motor itself is thus immediately reversed.

After the commutator 51 has been rotated into the position shown in Figures 6 and 9, it is held in this position as long as current is supplied to the solenoid 53, but when the circuit is broken by opening of switch 33 or 34, the solenoid 53 is deenergized and the weight of arm 52 or spring returns the parts to the positions shown in Figures 3, 4 and 7.

The motor is also automatically reversed by the action of the solenoid 53 whenever during downward motion of the door the switch 50 is closed, due to the striking of cord 41 upon an object beneath the door.

While the door operating mechanism has been disclosed more particularly in conjunction with the door of the type which moves upward and swings from a vertical to a horizontal position, it will be apparent that this apparatus may be used for objects moving in many other directions, as for instance, doors hinged to swing about vertical axes, gates, and the like, including those which may be slid vertically or horizontally, and that for any such purposes, as relatively simple modifications in the linkage between the carriage and the part to be moved may readily be accomplished. For instance, such links as shown in my prior Patent No. 1,966,762, dated July 17, 1934, may be employed.

From the above it will be apparent that I have devised a relatively simple mechanism in which a single motor may be used, which may be operated from any one of a number of control points, or even from within a moving vehicle, and which definitely assures that the door will not be inadvertently dropped upon a person or object.

At all times, except when the aparatus is being actuated no current is supplied except that necessary to illuminate the tell tale lights and these, of course, can be dispensed with, as desired.

Figures 21 and 22 show a relay in which the fixed magnet is positioned within the coil, instead of outside, as in the form of Figures 10 to 13.

In this instance, conductors 267 and 268 are connected to the ends of coil 269, a flat permanent magnetic armature 270 is suspended to rotate within this coil and carries movable contact 271, which may close either of the switches 273 or 274, corresponding to contacts 73 and 74 described in conjunction with the previous form.

The coils and magnet are shielded within a casing of magnetic material 208 and bars 209 of magnetic material are interposed between the shield and the coil for adjustment.

While the manner of attachment of coil 59 to the vehicle is not shown in detail, it will be appreciated that this coil should be supported as closely adjacent the pavement as possible without impairing the road clearance to reduce the distance that the magnetic flux must travel to reach the coil 65 and should be so positioned that its operation will not be seriously impaired by the magnetic material of the vehicle itself.

It need not be permanently fixed in a single position on the car, but will be more effective if it may be lowered to nearly touch the paving when desired. It may, for instance, be supported on a pivoted arm between the chassis or running board of the car, and the dropping of this arm may be, if desired, caused to close a switch or otherwise complete the circuit to the coil, preventing current from being wasted when the coil is in raised or traveling position.

While I have described the illustrated embodiment of my invention in some particularity, obviously many others will readily occur to those skilled in this art, and I do not, therefore, limit myself to the precise details shown and described, but claim as my invention all embodiments, variations, and modifications thereof coming within the scope of the appended claims.

I claim:

1. A door operating apparatus comprising a reversible motor, power transmitting mechanism operatively connected thereto and to a door to be controlled, two control circuits connected to the motor, one operating the motor in one direction and the other operating the motor in the other direction, a relay selectively controlling said control circuits, current supplying means connected to the relay including a stationary secondary coil, a primary coil carried by a vehicle, a source of electrical energy connected to the primary coil, and control means between said source of energy and primary coil selectively determining the direction of current flow through the primary coil to selectively actuate the relay to energize one or the other of the two control circuits, the primary coil and secondary coil being positioned to be brought into closely adjacent side-by-side parallel alignment as the vehicle approaches the door.

2. A door operating apparatus comprising a reversible motor, power transmitting mechanism operatively connected thereto and to a door to be controlled, two control circuits connected to the motor, one operating the motor in one direction and the other operating the motor in the other direction, a relay controlling said control circuits, current supplying means connected to the relay including a stationary secondary coil, a primary coil carried by a vehicle, a source of electrical energy connected to the primary coil, and control means between said source of energy and primary coil selectively determining the direction of current flow through the primary coil to selectively control one or the other of the two control circuits, the secondary coil being below the surface upon which the vehicle travels and arranged with its axis substantially horizontal and the primary coil on the vehicle having its axis substantially horizontal and arranged substantially parallel to that of the secondary coil as the vehicle normally approaches the door.

AUGUST P. KONTER.